(12) United States Patent
Yuda et al.

(10) Patent No.: US 10,084,636 B2
(45) Date of Patent: Sep. 25, 2018

(54) TRANSMISSION APPARATUS, RECEPTION APPARATUS, TRANSMISSION METHOD, AND RECEPTION METHOD

(71) Applicant: Panasonic Intellectual Property Corporation of America, Torrance, CA (US)

(72) Inventors: Yasuaki Yuda, Kanagawa (JP); Seigo Nakao, Singapore (SG); Masayuki Hoshino, Kanagawa (JP); Tetsuya Yamamoto, Kanagawa (JP); Fumiyuki Adachi, Miyagi (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 133 days.

(21) Appl. No.: 15/190,187

(22) Filed: Jun. 23, 2016

(65) Prior Publication Data
US 2016/0301557 A1    Oct. 13, 2016

Related U.S. Application Data

(63) Continuation of application No. PCT/JP2014/005844, filed on Nov. 20, 2014.

(30) Foreign Application Priority Data

Feb. 21, 2014  (JP) ................................. 2014-031505

(51) Int. Cl.
*H04L 12/24* (2006.01)
*H04L 5/00* (2006.01)
*H04L 27/26* (2006.01)

(52) U.S. Cl.
CPC ........ *H04L 41/0226* (2013.01); *H04L 5/0048* (2013.01); *H04L 27/2626* (2013.01); *H04L 27/2663* (2013.01); *H04L 27/2675* (2013.01)

(58) Field of Classification Search
CPC ............. H04L 27/2626; H04L 27/2663; H04L 27/2675; H04L 41/0226; H04L 5/0048
(Continued)

(56) References Cited

U.S. PATENT DOCUMENTS 5,425,058 A  *  6/1995  Mui ..................... H04L 27/2338
                                                329/300
6,301,268 B1    10/2001  Laroia et al.
(Continued)

FOREIGN PATENT DOCUMENTS

EP    2 317 676 A1    5/2011
JP    11-331122       11/1999
(Continued)

OTHER PUBLICATIONS

International Search Report of PCT application No. PCT/JP2014/005844 dated Jan. 13, 2015.
(Continued)

*Primary Examiner* — Stephen J Clawson
(74) *Attorney, Agent, or Firm* — Seed IP Law Group LLP

(57) ABSTRACT

In a transmission apparatus, a mapper maps frequency components of an analog signal at equally spaced discrete locations within a transmission frequency band, a time-division multiplexer time-division multiplexes the analog signal and a preamble signal to generate a transmission signal, the preamble signal being a digital signal whose frequency components are continuously mapped over the transmission frequency band, and a transmitter transmits the transmission signal, wherein an autocorrelation value of the transmission signal being to be used for timing synchronization at a reception apparatus that receives the transmission signal.

8 Claims, 10 Drawing Sheets

(58) Field of Classification Search
USPC .......................................................... 370/328
See application file for complete search history.

(56) References Cited

U.S. PATENT DOCUMENTS

| | | | | |
|---|---|---|---|---|
| 7,787,431 | B2* | 8/2010 | Li | H04L 5/0007 370/343 |
| 7,796,716 | B2* | 9/2010 | Bhukania | H04L 27/2647 375/231 |
| 8,199,706 | B2* | 6/2012 | Bertrand | H04L 27/2613 370/329 |
| 9,667,457 | B2* | 5/2017 | Yamazaki | H04L 25/4906 |
| 2007/0104298 | A1* | 5/2007 | Filipovic | H03J 7/10 375/344 |
| 2008/0013639 | A1* | 1/2008 | Rick | H04B 1/707 375/260 |
| 2008/0080472 | A1* | 4/2008 | Bertrand | H04J 11/005 370/344 |
| 2008/0316961 | A1* | 12/2008 | Bertrand | H04W 74/004 370/329 |
| 2010/0177723 | A1* | 7/2010 | Kim | H04L 5/0048 370/329 |
| 2012/0026962 | A1 | 2/2012 | Inoue et al. | |
| 2015/0003348 | A1* | 1/2015 | Ishii | H04L 27/2601 370/329 |
| 2015/0341586 | A1* | 11/2015 | Allison, III | H04N 5/40 348/724 |
| 2016/0020929 | A1* | 1/2016 | Yamazaki | H04L 1/0003 375/300 |
| 2016/0301557 | A1* | 10/2016 | Yuda | H04L 5/0048 |

FOREIGN PATENT DOCUMENTS

| | | |
|---|---|---|
| JP | 2001-512644 | 8/2001 |
| WO | 1998/037644 | 8/1998 |
| WO | 2010/116881 | 10/2010 |

OTHER PUBLICATIONS

Vo Thanh Hai et al., "A study on analog signal transmission using SC-FDMA", B-5-92, p. 502, Institute of Electronics, Information and Communication Engineers General Conference 2013, Mar. 2013 (Whole sentence Translation).

Takenori Sakamoto et al., "Development of oversampling and overlap-FDE for 60GHz multi-Gbps wireless communication II", B-5-17, pA16, Institute of Electronics, Information and Communication Engineers General Conference 2012, Mar. 2012 (Whole sentence Translation).

Susumu Sasaki et al., "QO-STBC Transmission Scheme Robust to Fast Fading Environment", Institute of Electronics, Information and Communication Engineers, vol. J94-B No. 2, p. 245, 2011 (Whole sentence Translation).

Vo Thanh Hai et al., "SSB Transmission using Analog SC-FDE", IEICE Technical Report, RCS2013-60, Jun. 2013.

Thanh Hai Vo et al., "A Study on analog signal transmission using SC-FDMA," B-5-92, Proceedings of IEICE General Conference 1, Mar. 19-22, 2013, 2 pages.

Extended European Search Report, dated Jan. 24, 2017, for corresponding EP Application No. 14883096.1-1505 / 3110030, 9 pages.

Thanh Hai Vo et al., "SSB Transmission using Analog SC-FDE," Domestic academic society report 2013-00594-020, Japan, The Institute of Electronics, Information and Communication Engineers, Jun. 13, 2013, vol. 113, No. 93, pp. 135-140.

Susumu Sasaki et al., "QO-STBC Transmission Scheme Robust to Fast Fading Environment", Domestic academic society report 2011-00060-016, Japan, The Institute of Electronics, Information and Communication Engineers, Feb. 15, 2011, vol. J94-B, No. 2, pp. 245-252.

* cited by examiner

FREQUENCY SPECTRUM

FREQUENCY COMPONENTS ARE DISCRETELY DISTRIBUTED AT EQUAL INTERVALS

TIME WAVEFORM

REPETITIVE WAVEFORM

CALCULATED AUTOCORRELATION VALUES OF TIME WAVEFORM

PLURALITY OF PEAKS ARE DETECTED

FREQUENCY SPECTRUM

FREQUENCY COMPONENTS ARE CONTINUOUSLY DISTRIBUTED IN BAND

TIME WAVEFORM

WAVEFORM HAS NO REPETITION

CALCULATED AUTOCORRELATION VALUES OF TIME WAVEFORM

SINGLE PEAK IS DETECTED

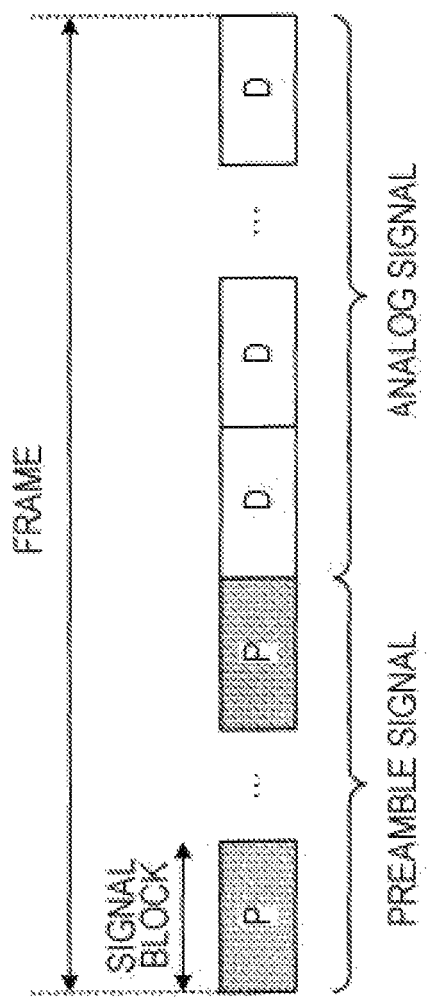

TRANSMISSION APPARATUS, RECEPTION APPARATUS, TRANSMISSION METHOD, AND RECEPTION METHOD

BACKGROUND

1. Technical Field

The present disclosure relates to a transmission apparatus, a reception apparatus, a transmission method, and a reception method.

2. Description of the Related Art

Analog Signal Transmission

In analog signal transmission, it is allowed at a receiving end to demodulate a received signal without using a reference signal or the like, and a reception apparatus is allowed to be configured in a simple form. Thus the analog signal transmission has been conventionally used in radio transmission and the like. Examples of analog signals include an amplitude modulation (AM) signal which is obtained by modulating a signal to be transmitted to an amplitude component of a carrier wave.

Because the analog signal transmission can be realized with a simple configuration and for other reasons, the analog signal transmission is attracting attention as one of techniques used in future wireless communication (see, for example, Thanh Hai Vo et al. "SSB transmission using analog SC-FDE", IEICE Technical Report RCS 2013-60, June, 2013). For example, in the analog signal transmission, it is allowed to demodulate a received signal without using a reference signal or the like, the analog signal transmission is expected to be useful for broadcast communication in which nonconfidential information is transmitted from one sender to a plurality of receivers.

Compared with digital signal transmission, the analog signal transmission has features described below.

First, an advantage of the analog signal transmission is that a transmission delay is small compared with the digital signal transmission. In the digital signal transmission, when analog information such as an audio signal is transmitted, it is necessary to perform a quantization process to convert the analog signal to a digital signal, and it is also necessary to perform further signal processing such as channel coding, decoding, etc. The analog signal transmission does not need such processing, and thus a delay due to such processing is suppressed.

On the other hand, a drawback is a poor transmission characteristic. In general, the analog signal transmission is used for transmission of audio signals, and thus a signal band thereof is narrow compared with the digital signal transmission. Because of the narrow signal band of the analog signal transmission, frequency nonselective fading may occur in the band, which may cause a possibility of an occurrence of a large reduction in reception level over the signal band. Such a reduction in reception level is due to an influence of fading in multipath propagation channels, and thus a reduction in reception level can occur anywhere regardless of transmission time, a transmission frequency, and a reception location. When a reduction in reception level of a received signal occurs at a receiving end, the ratio of noise power to signal power increases, and thus degradation in transmission characteristic occurs.

SUMMARY

In the analog signal transmission, as described above, degradation in transmission characteristic occurs in a multipath fading environment.

One non-limiting and exemplary embodiment provides a transmission apparatus, a reception apparatus, a transmission method, and a reception method, capable of achieving an improved transmission characteristic in analog signal transmission even in multipath fading environments.

In one general aspect, the techniques disclosed here feature a transmission apparatus comprises a mapper that maps frequency components of an analog signal at equally spaced discrete locations within a transmission frequency band, a multiplexer that time-division multiplexes the analog signal to generate a transmission signal, the preamble signal being a digital signal whose frequency components are continuously mapped over the transmission band, and a transmitter that transmits the transmission signal, an autocorrelation value of the transmission signal being to be used for timing synchronization at a reception apparatus that receives the transmission signal.

According to the present disclosure, it is possible to improve the transmission characteristic in the analog signal transmission even in multipath fading environments.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 illustrates a frame configuration according to the second embodiment of the present disclosure;

DETAILED DESCRIPTION

The present disclosure is described in detail below with reference to embodiments in conjunction with drawings.

First Embodiment

Transmission Diversity Technique

One of techniques to improve transmission characteristics is a transmission diversity technique. However, in the analog signal transmission, as described above, it is difficult to apply a complicated process to an analog signal itself. In this situation, to apply the transmission diversity technique to the analog signal transmission, for example, a single frequency network (SFN) may be employed to transmit the same signal from a plurality of antennas.

In SFN, because the same signal is transmitted from a plurality of antennas, it is predicted to achieve an improvement in average reception signal power at a receiving end. On the other hand, in SFN, a multipath environment is artificially formed. Therefore, when a short-period reception situation is seen, there is a possibility that a large reduction in reception level occurs when signals transmitted from the respective antennas cancel out each other due to an influence of multipath fading depending on a transmission time, a transmission frequency, or a reception location of the signal, which may cause degradation in transmission characteristic.

In view of the above, the present embodiment discloses a method of improving transmission characteristic of an analog signal even in a multipath fading environment using a spatial diversity technique as an example of a transmission diversity technique.

A communication system according to a present embodiment includes a transmission apparatus 100 and a reception apparatus 200.

Configuration of Transmission Apparatus 100

Figure 1:
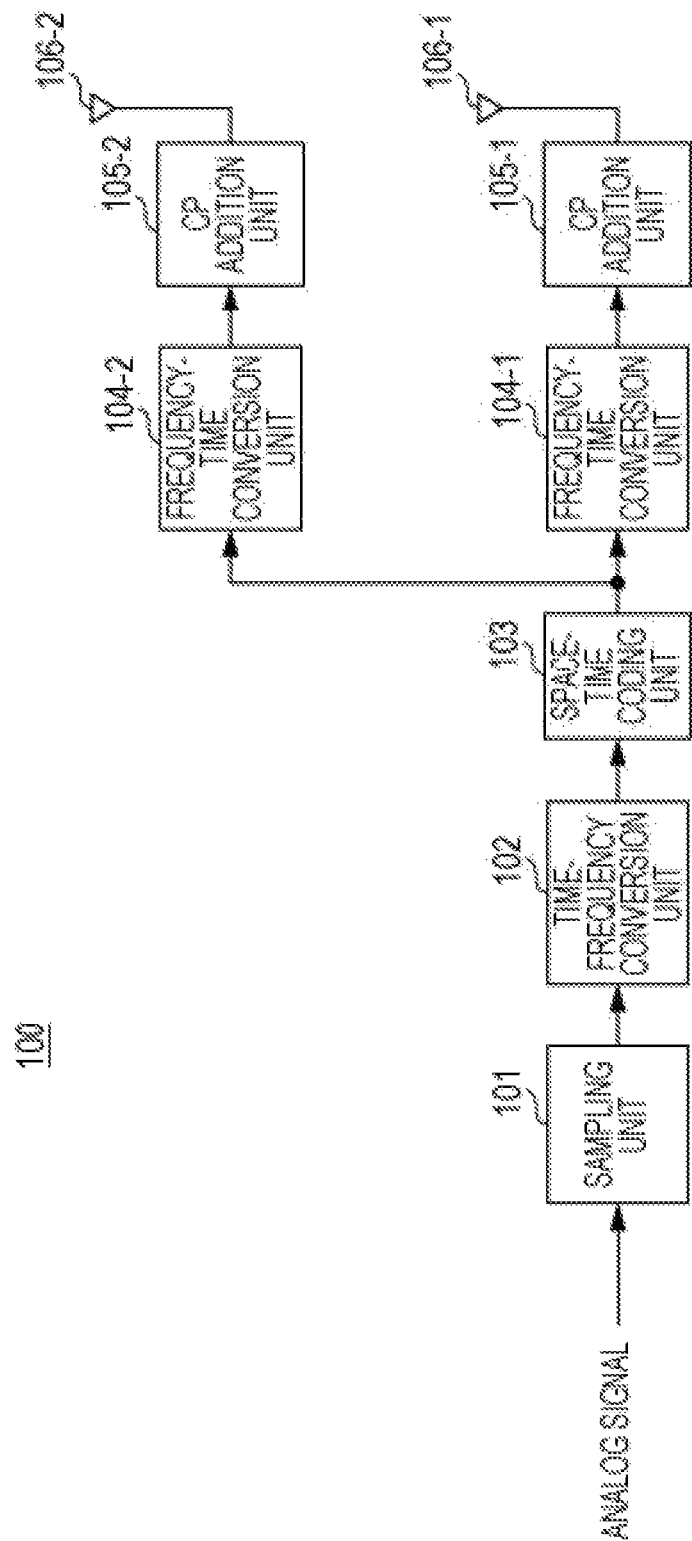
FIG. 1 illustrates a configuration of a transmission apparatus according to a first embodiment of the present disclosure.

FIG. 1 is a block diagram illustrating a configuration of a transmission apparatus 100 according to a present embodiment. In FIG. 1, the transmission apparatus 100 includes a sampling unit 101, a time-frequency conversion unit 102, a space-time coding unit 103, a frequency-time conversion units 104-1 and 104-2, CP (Cyclic Prefix) addition units 105-1 and 105-2, and antennas 106-1 and 106-2.

The sampling unit 101 receives an input of an analog signal transmitted from the transmission apparatus 100 to the reception apparatus 200. The analog signal is, for example, an audio signal, which is a signal with a temporally continuous analog waveform.

The sampling unit 101 performs a sampling process on the input analog signal at constant time intervals, and outputs a sampling signal to the time-frequency conversion unit 102.

The time-frequency conversion unit 102 accumulates sampling signals received from the sampling unit 101 until a predetermined number of sampling signals are obtained, and the time-frequency conversion unit 102 converts a time waveform to frequency components for each signal block including the predetermined number of sampling signals. An example of a time-frequency conversion is a discrete Fourier transformation (DFT). The time-frequency conversion unit 102 outputs the frequency components to the space-time coding unit 103.

The space-time coding unit 103 applies space time block coding (STBC) to the frequency components received from the time-frequency conversion unit 102. The space-time coding unit 103 outputs signals, to be transmitted from the respective antennas 106, to frequency-time conversion units 104 corresponding to the respective antennas 106.

The frequency-time conversion unit 104-1 and the CP addition unit 105-1 correspond to the antenna 106-1, and the frequency-time conversion unit 104-2 and the CP addition unit 105-2 correspond to the antenna 106-2.

The frequency-time conversion units 104-1 and 104-2 convert the frequency components of the signals received from the space-time coding unit 103 to time waveforms for each signal block. An example of a frequency-time conversion is an inverse discrete Fourier transformation. The frequency-time conversion units 104-1 and 104-2 output the time waveform signal of each signal block to the respective CP addition units 105-1 and 105-2.

The CP addition units 105-1 and 105-2 add CPs to the time waveform signals of the signal block received from the frequency-time conversion units 104-1 and 104-2. For example, the CP addition units 105-1 and 105-2 may add a head portion of the signal block as the CP to the tail of the signal block. The signals added with the CPs are transmitted via the antennas 106-1 and 106-2. Note that the signals output from the CP addition units 105-1 and 105-2 are subjected to a frequency conversion to an RF frequency, and the resultant converted signals are transmitted.

As described above, the transmission apparatus 100 applies a space time block coding based transmit diversity (STTD) algorithm to the analog signal.

Configuration of Reception Apparatus 200

Figure 2:
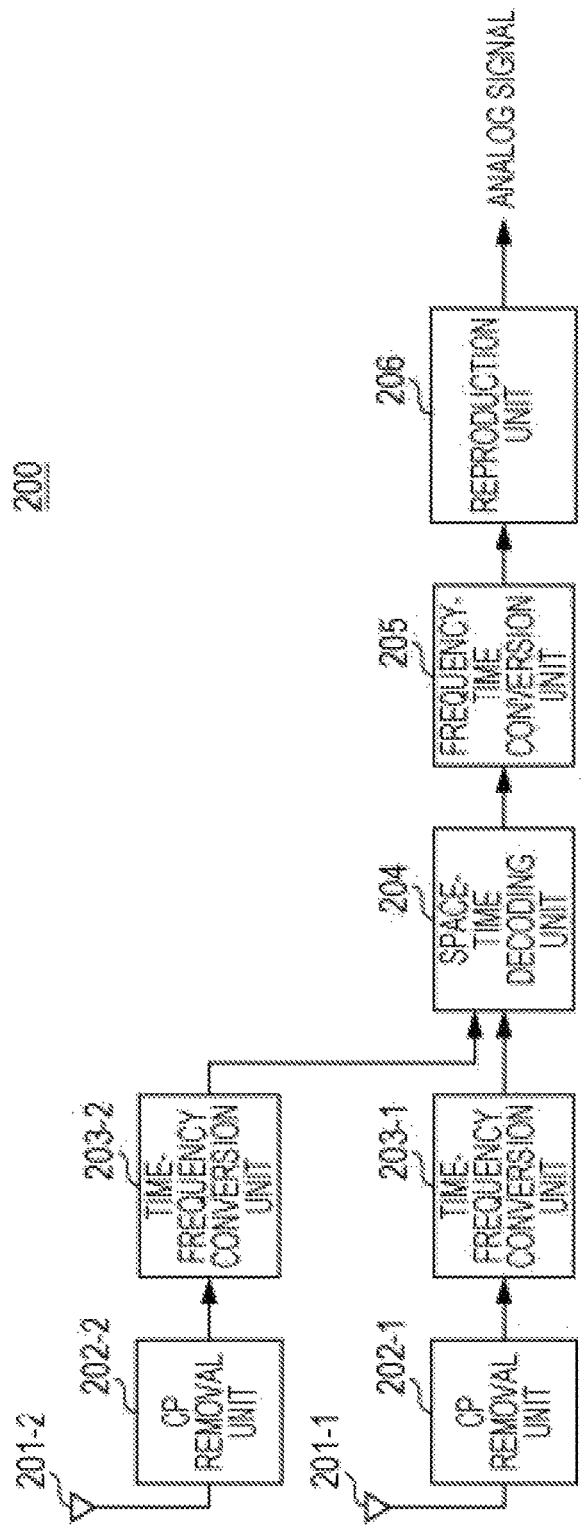
FIG. 2 illustrates a configuration of a reception apparatus according to the first embodiment of the present disclosure.

FIG. 2 is a block diagram illustrating a configuration of the reception apparatus 200 according to the present embodiment. In FIG. 2, the reception apparatus 200 includes antennas 201-1 and 201-2, CP removal units 202-1 and 202-2, time-frequency conversion units 203-1 and 203-2, a space-time decoding unit 204, a frequency-time conversion 205, and a reproduction unit 206.

The signal transmitted from the transmission apparatus 100 is received via the antennas 201-1 and 201-2. The received signal is converted from the RF frequency to a baseband, and output to the CP removal units 202-1 and 202-2.

The CP removal unit 202-1 and the time-frequency conversion unit 203-1 correspond to the antenna 201-1, while the CP removal unit 202-2 and the time-frequency conversion unit 203-2 correspond to the antenna 201-2.

The CP removal units 202-1 and 202-2 remove CPs from the received signals received from the antennas 201-1 and 201-2. The CP removal units 202-1 and 202-2 output the resultant signals subjected to the CP removal (the time waveform signals in each signal block) to the time-frequency conversion units 203-1 and 203-2.

The time-frequency conversion units 203-1 and 203-2 convert the time waveforms of the signals received from the CP removal units 202-1 and 202-2 to frequency components. An example of the time-frequency conversion is DFT. The time-frequency conversion units 203-1 and 203-2 output the frequency components to the space-time decoding unit 204.

The space-time decoding unit 204 performs a decoding process on the space-time block code (STBC) for each frequency component (for example, for each subcarrier) using the frequency components received from the respective time-frequency conversion units 203-1 and 203-2. The space-time decoding unit 204 outputs the resultant signal subjected to the decoding process to the frequency-time conversion unit 205.

The frequency-time conversion unit 205 converts the frequency components of the signal received from the space-time decoding unit 204 to time waveform blocks (discrete time waveforms). An example of this frequency-time conversion is IDFT. The frequency-time conversion unit 205 outputs the time waveform signal to the reproduction unit 206.

The reproduction unit 206 reproduces a temporally continuous analog signal using the time waveform signal (discrete time waveform) received from the frequency-time conversion unit 205. For example, the reproduction unit 206 may pass the discrete time waveform through a low pass filter (LPF) thereby reproducing the continuous signal from the discrete signal. As a result, a temporally continuous analog signal is obtained.

Operations of Transmission Apparatus 100 and Reception Apparatus 200

Operations of the transmission apparatus 100 and the reception apparatus 200 configured in the above-described manner are described.

The transmission apparatus 100 performs sampling on the analog signal at regular time intervals and assembles a predetermined number of sampled discrete analog signals into one signal block thereby generating signal blocks. The transmission apparatus 100 converts the time waveform to frequency components for each block and applies STBC coding to each frequency component.

For example, a STBC matrix S shown below may be used in the STBC coding for two-antenna transmission such as that illustrated in FIG. 1.

$$S = \begin{bmatrix} S_{n,f} & -S^*_{n+1,f} \\ S_{n+1,f} & S^*_{n,f} \end{bmatrix} \quad (1)$$

where $S_{n,f}$ denotes a signal of a frequency component f in an n-th signal block, and $S_{n+1,f}$ denotes a signal of a frequency component f in an (n+1)th signal block. A superscript * denotes complex conjugate.

That is, the transmission apparatus 100 processes the {n, n+1}-th signal block such that $\{S_{n,f}, -S^*_{n+1,f}\}$ is transmitted from one of the antennas 106 while $\{S_{n+1,f}, S^*_{n,f}\}$ is transmitted from the other one of the antennas 106 thereby applying the STBC coding to the frequency component f.

The transmission apparatus 100 applies the STBC coding to the whole transmission signal by applying the STBC coding individually to each frequency component f (for example, individually to each subcarrier).

The transmission apparatus 100 then converts the resultant signal subjected to the STBC coding individually for each signal block from the frequency components to time waveform signals for each of the antennas 106-1 and 106-2 and adds CP thereto, and the transmission apparatus 100 transmits the resultant signals.

On the other hand, the reception apparatus 200 removes the CP from the received signal received via the antennas 201-1 and 201-2, converts the time waveform signal to frequency components, and applies STBC decoding to the frequency components.

Thus, using the STTD algorithm in the above-described manner allows it to achieve a maximum ratio combining gain of a plurality of transmission lines having different transmission points, which makes it possible for the reception apparatus 200 to achieve a high transmission diversity gain. Thus, unlike the case in which SFN is applied, the reception apparatus 200 does not have a large reduction in signal level caused by multipath fading depending on the signal transmission time, the transmission frequency, or the reception location.

Furthermore, in the STTD algorithm, a process of permuting locations of the transmission signal in the time domain is performed (for example, according to formula (1)), and thus the transmission apparatus 100 applies the STTD to a discrete analog signal obtained by sampling a temporally continuous signal such as an analog signal at regular time intervals. This makes it possible to apply the STTD algorithm to analog signal transmission.

Two methods for signal transmission are known: "serial transmission" in which a time-series sampled signal (sampling signals) is directly transmitted sequentially; and "block transmission" in which a particular number of sampling signals are transmitted in a lump. In an environment in which multipath fading occurs, different methods for compensating for multipath fading are used for the respective transmission methods.

More specifically, in the serial transmission, multipath fading causes an interference to occur between transmitted sampling signals, and a sequential equalizer using an adaptive filter is necessary to remove the interference. Therefore, in a case where STBC is applied in the serial transmission, it is necessary to perform a complicated process including permuting of signals at each sampling point at a transmission end, multiplication of block codes, and the like. At a receiving end, it is necessary to perform an STBC decoding process at each sampling point. Thus a combination of this decoding process and the sequential equalization process at each sampling point results in a complicated process.

In contrast, in the block transmission, the inter-block interference can be suppressed by using CP, while the interference between transmission sampling signals in a block can be suppressed by applying a block-by-block equalization such as a frequency-domain equalization.

Thus, by applying the STBC to the block transmission as in the present embodiment, it is possible, at the transmission and reception ends, to perform STBC coding and decoding and multipath fading equalization process on a block-by-block basis. That is, by applying block transmission to an analog signal as in the present embodiment, it becomes possible to perform the process in lump on a block-by-block basis without performing a sequential process on a sampling signal. Thus it becomes possible to easily perform the transmission/reception process at both transmission and reception ends.

According to the present embodiment, as described above, by applying the STBC to the analog signal, it is possible to achieve the maximum ratio combining gain of the transmission lines from the respective transmitting antennas, that is, it is possible to achieve spatial diversity effect. Thus, according to the present embodiment, it is possible to improve the transmission characteristic in the analog signal transmission even in the multipath fading environment.

Furthermore, according to the present embodiment, by applying the block transmission to the analog signal transmission, it becomes possible to perform transmission/reception process on the block-by-block basis, which makes it possible to simplify the configuration of each apparatus at the transmission/reception end.

In the present embodiment described above, it is assumed by way of example that the transmission apparatus 100 has two antennas. However, the number of antennas of the transmission apparatus 100 is not limited to two, but the transmission apparatus 100 may have three or more antennas. In the present embodiment described above, it is also assumed by way of example that the reception apparatus 200 has two antennas. However, the number of antennas of the reception apparatus 200 is not limited to two, but the reception apparatus 200 may have three or more antennas.

Second Embodiment

In a second embodiment described below, an explanation is given for a case where frequency diversity transmission is used as a transmission diversity technique.

To handle a reduction in reception level of an analog signal due to an influence of frequency nonselective fading, it is under investigation to achieve a diversity effect by employing frequency diversity transmission (see, for example, Thanh Hai Vo et al. "SSB transmission using analog SC-FDE", IEICE Technical Report RCS 2013-60, June, 2013). In a block transmission method for an analog signal disclosed in Thanh Hai Vo et al. "SSB transmission using analog SC-FDE", IEICE Technical Report RCS 2013-60, June, 2013, frequency components (subcarriers) of a transmission signal block are mapped discretely at equally spaced locations so as to achieve a broader transmission band than a frequency band of an original signal. In this technique, at a transmission end, to remove an inter-block interference, CP is added to a transmission signal block and the resultant transmission signal block added with the CP is transmitted. At a reception end, it is possible to apply frequency domain equalization (FDE) as a block equalization process.

Figure 3A:
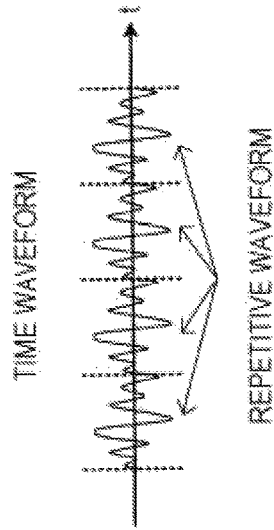
FIGS. 3A, 3B and 3C illustrate a signal waveform of an analog signal according to a second embodiment of the present disclosure.

For example, by mapping frequency components of an analog signal at equally spaced discrete locations as shown in FIG. 3A, it is possible to achieve two effects as described below.

A first effect is to widen the signal band, which allows it to achieve a frequency diversity effect. In a case of a narrowband analog signal, there is a possibility that a reduction in reception level occurs over a band depending on a frequency. However, by widening the signal band, it is possible to prevent a reduction in reception level to occur for all frequency components of the analog signal.

A second effect is that mapping the frequency components at equally spaced locations makes it possible to maintain the peak to average power ratio (PAPR) at the same value as that of the original signal. In general, in multicarrier transmission using a plurality of frequency components, PAPR becomes large. In contrast, multicarrier transmission using a plurality of frequency components mapped at equally spaced discrete locations has a feature that it is possible to maintain the PAPR at the same value as that obtained in the single-carrier transmission in which the frequency components are not discretely mapped. When PAPR is large, it is necessary to set output back-off at a high value to avoid nonlinear distortion in an amplifier at the transmission end, which results in a reduction in power efficiency. As a result, the transmission signal needs to have low PAPR.

Figure 3B:
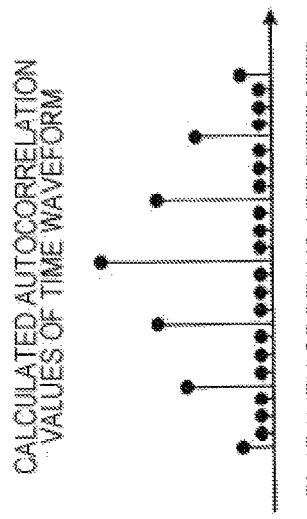

In contrast, frequency components mapped at equally spaced discrete locations have a time waveform appearing repeatedly in a particular period in a time domain as shown in FIG. 3B.

At the receiving end, it is necessary to achieve timing synchronization of signal blocks. A synchronization method is to calculate an autocorrelation value of a received signal, detect a maximum peak of the autocorrelation value, and achieve timing synchronization of the signal block. A specific method of calculating the autocorrelation is to calculate a sliding correlation of received signal blocks. The sliding correlation is a method of calculating a correlation value while sliding a signal series of signal blocks by a small amount at a time (for example, one signal at a time).

Figure 3C:
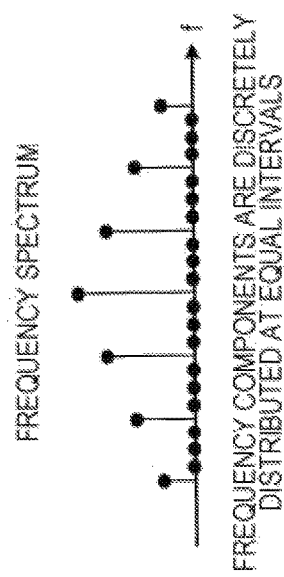

When autocorrelation values are calculated at the receiving end for a signal having a repetitive time waveform (FIG. 3B), the autocorrelation values have a plurality of peaks as shown in FIG. 3C. When timing synchronization is achieved based on the autocorrelation values described above, there is a possibility that a peak other than the maximum peak is detected by mistake at the receiving end, which causes a problem that it is impossible to achieve accurate timing synchronization.

Furthermore, to perform the FDE process at the receiving end, an estimated value of channel response (channel estimation value) is necessary. However, in the method of transmitting an analog signal such as that disclosed in Thanh Hai Vo et al. "SSB transmission using analog SC-FDE", IEICE Technical Report RCS 2013-60, June, 2013, the method is not configured to allow it to acquire a channel estimation value, and thus there is a problem that it is impossible to perform the FDE process at the receiving end.

In view of the above, the present embodiment discloses a method that allows it to achieve accurate timing synchronization at the receiving end even in a case where an analog signal whose frequency components are mapped at equally spaced discrete locations, and that allows it obtain accurate channel estimation value.

Figure 4:
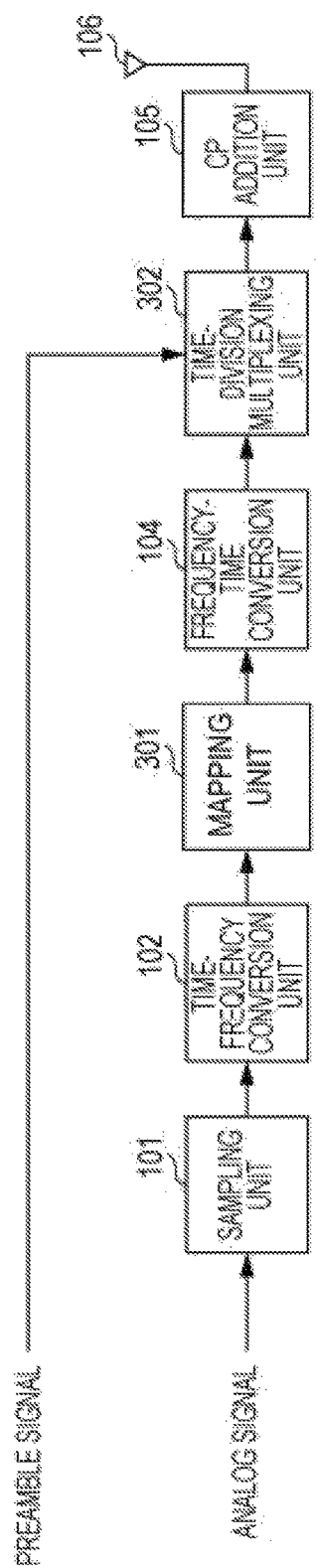
FIG. 4 illustrates a configuration of a transmission apparatus according to the second embodiment of the present disclosure.

FIG. 4 is a block diagram illustrating a configuration of a transmission apparatus 300 according to the present embodiment. In FIG. 4, similar components to those in the first embodiment (FIG. 1) are denoted by similar reference symbols, and a duplicated explanation thereof is omitted.

In the transmission apparatus 300 shown in FIG. 4, the mapping unit 301 maps frequency components (a narrowband analog signal) received from the time-frequency conversion unit 102 at equally spaced discrete locations over a band wider than a frequency band in which an original signal is mapped (see, for example, FIG. 3A). The mapping unit 301 outputs the discretely mapped frequency components to the frequency-time conversion unit 104.

The time-division multiplexing unit 302 time-division multiplexes an input preamble signal and the time waveform signal received from the frequency-time conversion unit 104. During a preamble signal transmission period, the time-division multiplexing unit 302 outputs the preamble signal to the CP addition unit 105, while, during an analog signal transmission period, the time-division multiplexing unit 302 outputs the time waveform signal received from the frequency-time conversion unit 104 to the CP addition unit 105.

Note that the preamble signal is a digital signal using a data series that is defined in advance and shared between the transmission apparatus 300 and the reception apparatus 400. The preamble signal is a signal having a time waveform with no repetition in the preamble signal transmission period. In other words, the preamble signal is a signal having frequency components continuously distributed over the entire transmission band in the frequency domain.

Figure 5:
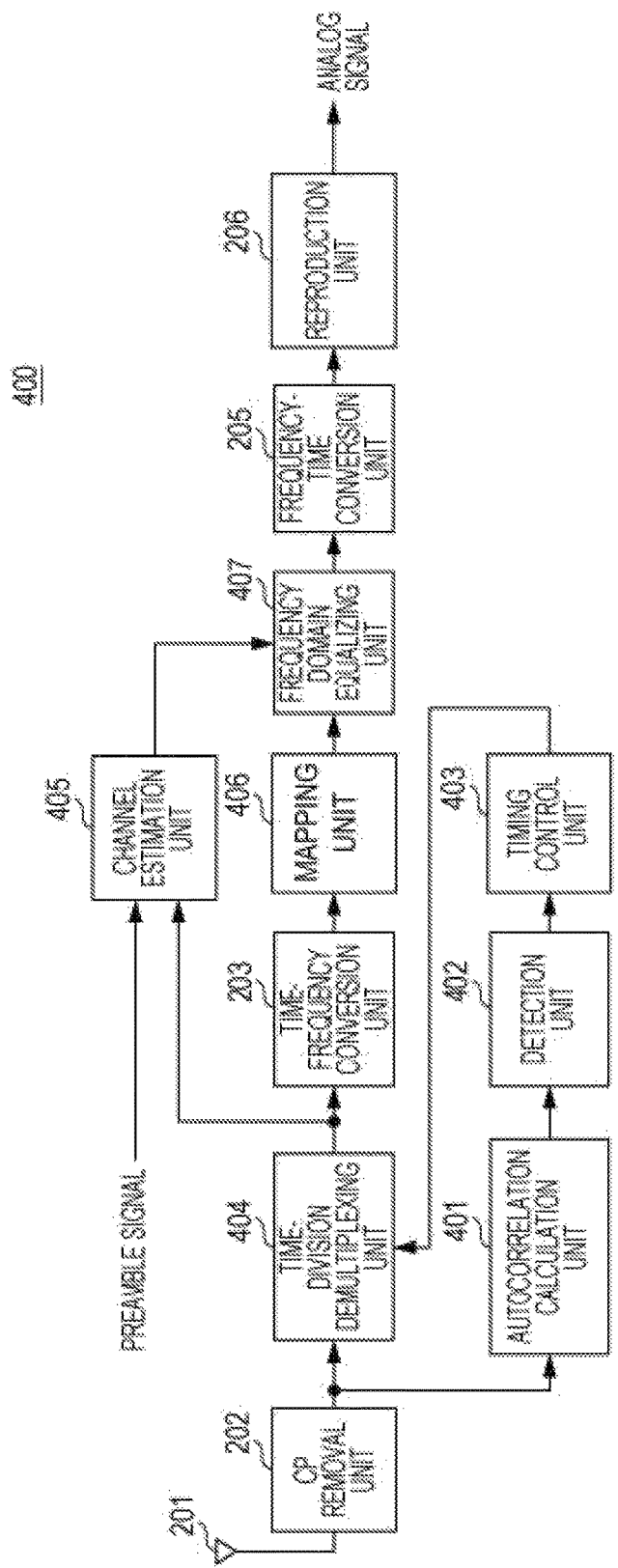
FIG. 5 illustrates a configuration of a reception apparatus according to the second embodiment of the present disclosure.

FIG. 5 is a block diagram illustrating a configuration of the reception apparatus 400 according to the present embodiment. In FIG. 5, similar components to those in the first embodiment (FIG. 2) are denoted by similar reference symbols, and a duplicated explanation thereof is omitted.

In the reception apparatus 400 shown in FIG. 5, the autocorrelation value calculation unit 401 calculates an autocorrelation value of a received signal received from the CP removal unit 202. The autocorrelation value calculation unit 401 calculates the autocorrelation value, for example, by applying a sliding correlation to a series of received signals corresponding to one signal block. The autocorrelation value calculation unit 401 outputs the calculated autocorrelation value to the detection unit 402.

The detection unit 402 detects a signal block having a single peak based on the autocorrelation value received from the autocorrelation value calculation unit 401. The detection unit 402 outputs a detection result to the timing control unit 403.

The timing control unit 403 controls the time-division demultiplexing unit 404 based on the detection result received from the detection unit 402 to control the timing of the reception processing in the reception apparatus 400. More specifically, the timing control unit 403 determines that a signal block having only a single peak is a timing of a signal block of a preamble signal, and outputs a determination result as control information to the time-division demultiplexing unit 404. The timing control unit 403 achieves the timing synchronization using the autocorrelation value of the received signal as described above.

The time-division demultiplexing unit 404 demultiplexes the received signal into a preamble signal and an analog signal using the control information (determination result) received from the timing control unit 403. More specifically, in a period corresponding to a signal block of the preamble signal, the time-division demultiplexing unit 404 outputs a signal received from the CP removal unit 202 as the preamble signal to the channel estimation unit 405, while in a period corresponding to a signal block of the analog signal, the time-division demultiplexing unit 404 outputs a signal received from the CP removal unit 202, as the analog signal, to the time-frequency conversion unit 203.

To the channel estimation unit 405, the preamble signal and the signal received from the time-division demultiplexing unit 404 are input. This preamble signal is a signal shared in advance between the transmission apparatus 300 and the reception apparatus 400. Using the preamble signal, the channel estimation unit 405 estimates a channel response on the signal received from the time-division demultiplexing unit 404 (that is, the received preamble signal). The channel estimation unit 405 outputs the estimated channel estimation value to the frequency-domain equalization unit 407.

The mapping unit 406 maps the signal received from the time-frequency conversion unit 203 (the analog signal whose frequency components are mapped at equally spaced discrete locations) at continuous locations in the frequency domain. The mapping unit 406 outputs the signal having continuously mapped frequency components to the frequency-domain equalization unit 407.

The frequency-domain equalization unit 407 performs the frequency-domain equalization (FDE) process on the signal received from the mapping unit 406 using the channel estimation value received from the channel estimation unit 405. In this process, the frequency-domain equalization unit 407 uses the channel estimation value of the same frequency components as those of the actually transmitted analog signal. The frequency-domain equalization unit 407 outputs the resultant signal subjected to the FDE to the frequency-time conversion unit 205.

Next, operations of the transmission apparatus 300 and the reception apparatus 400 according to the present embodiment are described.

Figure 6A:
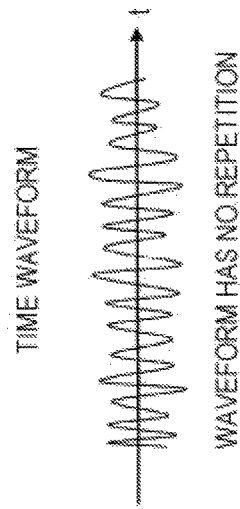
FIGS. 6A, 6B and 6C illustrate a signal waveform of a preamble signal according to the second embodiment of the present disclosure.

Using a preamble signal series, which is a digital signal, the transmission apparatus 300 generates a signal block of a preamble signal whose frequency components are continuously distributed as shown in FIG. 6A.

Figure 6B:
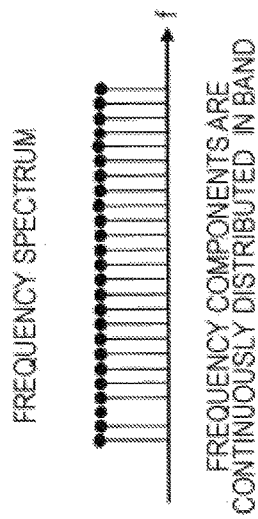

For example, as shown in FIG. 6A, the preamble signal is a digital signal (IQ signal) whose frequency components having fixed amplitudes are continuously distributed over the entire transmission band in the frequency domain. This preamble signal is a signal having a time waveform with no repetition in a particular period in the time domain as shown in FIG. 6B.

The transmission apparatus 300 and the reception apparatus 400 define in advance the preamble signal sequence of the digital signal so as to have a small PAPR even when frequency components are continuously distributed. This signal sequence is shared between the transmission apparatus 300 and the reception apparatus 400. Examples of sequences that allow it to have small PAPR are a Chu sequence, a Zadoff-Chu sequence, etc. However, the preamble signal is not limited to the Chu sequence or the Zadoff-Chu sequence, but other sequences may be used as long as it is allowed to have a small PAPR even when frequency components are distributed over the entire transmission band.

The transmission apparatus 300 then generates a transmission signal by time-division multiplexing the preamble signal (P) and the analog signal (D) as shown in FIG. 7. In this process, the transmission apparatus 300 determines the number of signal blocks of the preamble signal according to a predetermined ratio to the number of transmission blocks of the analog signal.

That is, the transmission apparatus 300 adds the preamble signal, which is the digital signal having a time waveform with no repetition in a particular period (see FIG. 6B), to the analog signal having a time waveform appearing repeatedly in a particular period (see FIG. 3B). In other words, the transmission apparatus 300 adds the preamble signal, which is the digital signal (see FIG. 6B) whose frequency components are continuously distributed over the same band as the band of the analog signal, to the analog signal (see FIG. 3A) whose frequency components are mapped at equally spaced discrete locations.

The reception apparatus 400 calculates the autocorrelation value based on the sliding correlation of the time waveform of the received signal and achieves timing synchronization based on a detected peak. More specifically, the reception apparatus 400 calculates the autocorrelation value based on a sliding correlation of a series of received signals corresponding to one transmission block.

Figure 6C:
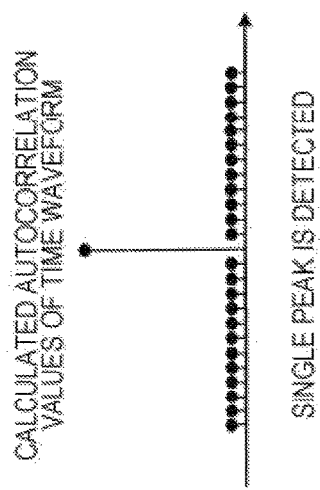

In a case where the reception apparatus 400 calculates the autocorrelation value of the time waveform of the preamble signals shown in FIG. 6A and FIG. 6B, a single peak is obtained as shown in FIG. 6C. That is, the reception apparatus 400 is capable of detecting only the single peak in the signal block. On the other hand, in a case where the reception apparatus 400 calculates the autocorrelation value of the time waveform of the analog signals shown in FIG. 3A and FIG. 3B, a plurality of peaks are obtained as shown in FIG. 3C.

In view of the above, the reception apparatus 400 determines whether or not the calculated autocorrelation value has only a single peak in one signal block. In a case where only a single peak appears in the signal block, the reception apparatus 400 detects a sample position of this peak and achieves the timing synchronization of the received signal. The reception apparatus 400 determines that the signal block having only the single peak is a signal block used in transmitting the preamble signal, and achieves the timing synchronization of the transmission frame.

The single peak may be detected using a method described below. For example, a threshold value may be set in advance in terms of maximum power within a signal block. In a case where there is only one sample point having power higher than the threshold value in a signal block, the reception apparatus 400 determines that this signal block is a block having only a single peak, that is, this signal block is a signal block used in transmitting a preamble signal. On the other hand, in a case where there are a plurality of points with power higher than the threshold value within a signal block, the reception apparatus 400 determines that this signal block is a signal block having a plurality of peaks (a signal block used in transmitting an analog signal).

In the reception apparatus 400, as described above, by detecting a single peak such as that shown in FIG. 6C, it becomes possible to prevent wrong peaks such as those shown in FIG. 3C from being detected, and thus it becomes possible to achieve accurate timing synchronization.

In the present embodiment, as described above, the reception apparatus 400 achieves the timing synchronization using the preamble signal which is a digital signal whose autocorrelation value has a single peak in a signal block. More specifically, as the preamble signal, a signal having a time waveform with no repetition and having frequency components distributed continuously is used. By using such a preamble signal, the reception apparatus 400 is capable of achieving accurate timing synchronization even in a case where an analog signal having frequency components mapped at equally spaced discrete locations is received.

An arbitrary multicarrier signal having continuously distributed frequency components generally tends to have a large PAPR. However, in the present embodiment, a series having a small PAPR is defined in advance as the preamble signal, and thus the transmission apparatus 300 and the reception apparatus 400 are allowed to use this series with small PAPR as the preamble signal having continuously distributed frequency components.

Furthermore, by using the preamble signal series shared between the transmission apparatus 300 and the reception apparatus 400, the reception apparatus 400 estimates a channel response to the received preamble signal. The preamble signal received by the reception apparatus 400 is a signal obtained by multiplying the preamble signal transmitted by the transmission apparatus 300 by the channel response between the transmission apparatus 300 and the reception apparatus 400. Therefore, the reception apparatus 400 is capable of estimating the channel response by which the received preamble signal has been multiplied, by dividing the received preamble signal by a symbol point of the preamble signal used in transmission by the transmission apparatus 300.

According to the present embodiment, the reception apparatus 400 uses the preamble signal, which is a digital signal, to estimate the channel estimation value as described above. Use of the digital signal in the channel estimation makes it possible for the reception apparatus 400 to detect a channel estimation value including an amplitude component and a phase component, which allows it to perform the channel estimation more accurately. Thus, according to the present embodiment, the reception apparatus 400 is capable of performing the FDE process accurately on the analog signal.

As described above, according to the present embodiment, it is possible to achieve the frequency diversity effect by performing the FDE process accurately, and thus it is possible to achieve an improvement in the transmission characteristic in the analog signal transmission even in the multipath fading environment.

Variations of Second Embodiment

In the present embodiment, when the transmission apparatus 300 maps the frequency components of the analog signal at equally spaced discrete locations, the placement locations of the frequency components may be shifted depending on a user in a plurality of users or depending on an antenna in a plurality of antennas so as to multiplex the analog signals different among the plurality of users or among the plurality of antennas.

Figure 8:
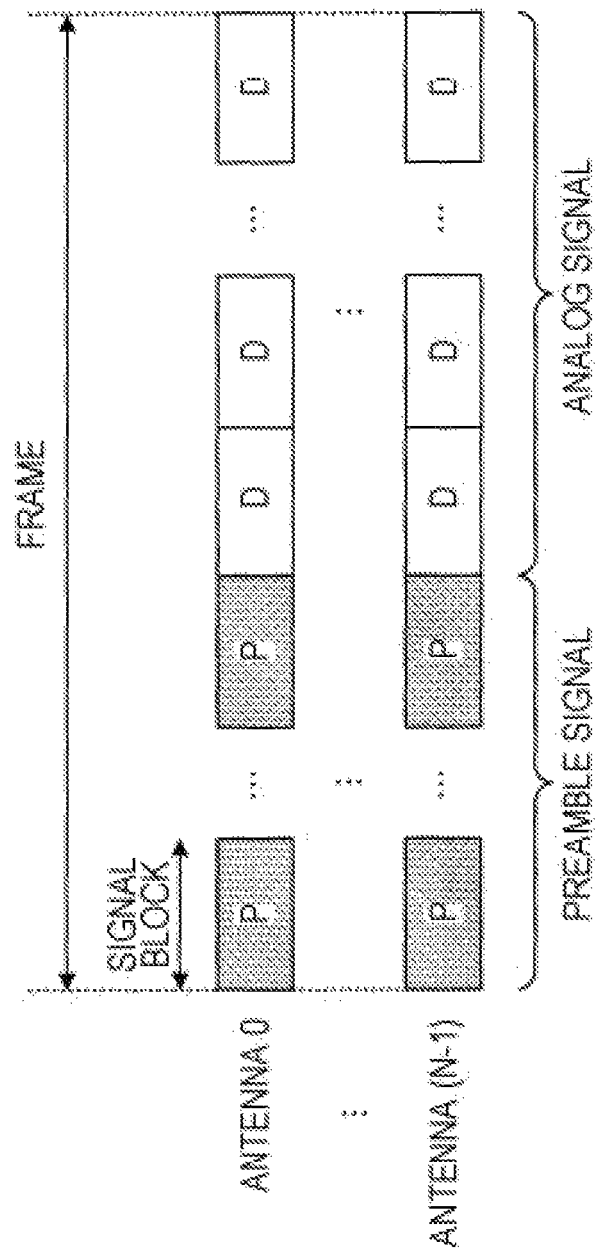
FIG. 8 illustrates a frame configuration according to a variation of the second embodiment of the present disclosure.

The transmission of the preamble signal for a plurality of users or a plurality of antennas may be performed by a method described below. To perform channel estimation individually for each antenna or to perform channel estimation individually for each user, at the transmission end, digital preamble signals are multiplexed and transmitted such that it is possible at the receiving end to estimate channel response individually for each antenna or for each user. FIG. 8 illustrates preamble signals for a case where N antennas are used in transmission (where N is an integer equal to or larger than 2).

An example of a method of multiplexing the preamble signals such as those shown in FIG. 8 is to apply a cyclic delay using a predetermined amount of delay to the digital preamble signal. The cyclic delay is a method in which, when the preamble signal is of a time series, the series is delayed as a whole in a backward direction by an amount corresponding to a predetermined number of symbols, and the predetermined number of symbols (with the particular amount of delay) are moved (cyclically shifted) from the tail of the series to the head of the series. In applying the cyclic delay, by assigning different amounts of delay (different numbers of symbols) to the respective antennas or users, it becomes possible at the receiving end to estimate channel response for each antenna or each user.

As a method of multiplexing the digital preamble signal, instead of using the cyclic delay, time-division multiplexing or code-division multiplexing may be used. In the time-division multiplexing, different times, for example, different transmission blocks are assigned to respective antennas or users such that it becomes possible at the receiving end to individually estimate the channel response of each antenna or each user. In the code-division multiplexing, different codes are assigned to respective antennas or users such that it becomes possible at the receiving end to individually estimate the channel response of each antenna or each user.

Alternatively, frequency multiplexing may be used as the method of multiplexing the preamble signals. As described above, a signal whose frequency components are mapped at equally spaced discrete locations has a time waveform appearing repeatedly. In view of the above, signals whose frequency components are mapped at unequally spaced discrete locations may be employed as preamble signals, and preamble signals mapped at different discrete locations may be assigned to respective antennas or users thereby achieving frequency-division multiplexing. This makes it possible at the receiving end to individually estimate the channel response of each antenna or each user.

Third Embodiment

A third embodiment is a combination of the first embodiment and the second embodiment. That is, in the third embodiment, the STTD algorithm is applied to each block of an analog signal in a similar manner to the first embodiment, and frequency components of the analog signal are mapped at equally spaced discrete locations and a preamble signal which is a digital signal having a time waveform with no repetition is added in a similar manner to the second embodiment.

Figure 9:
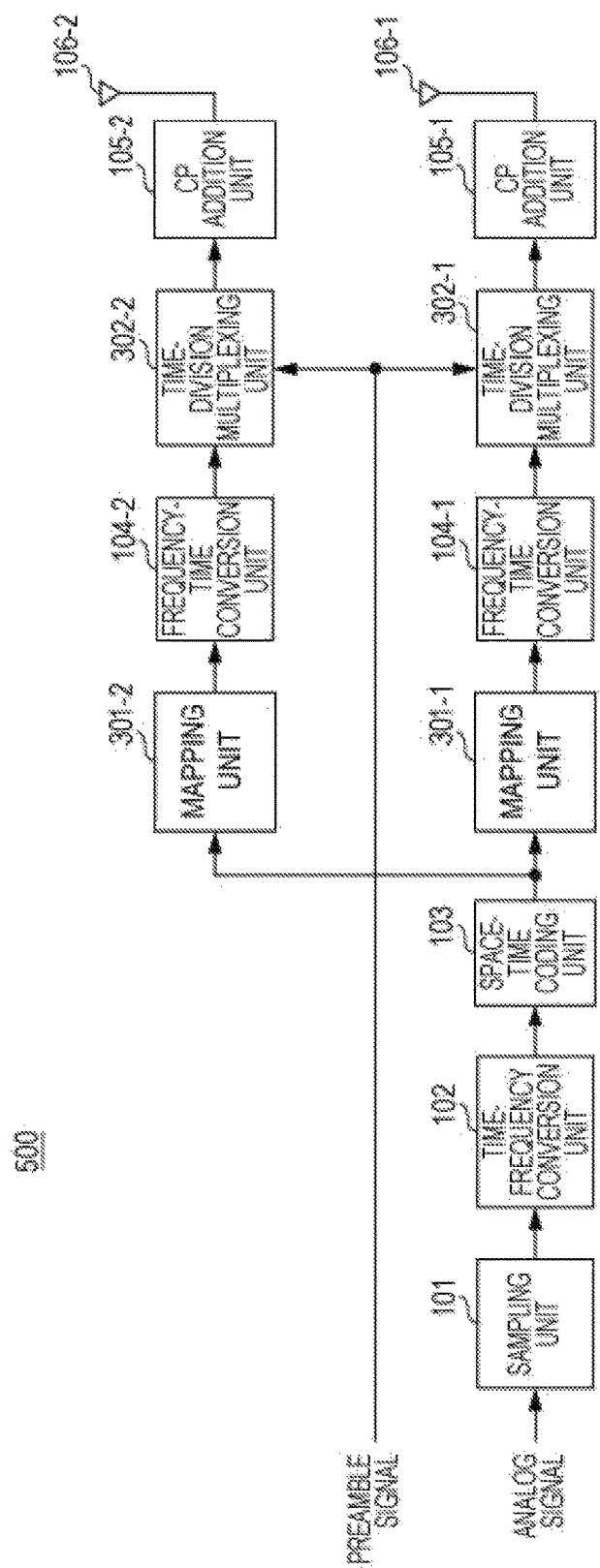
FIG. 9 illustrates a configuration of a transmission apparatus according to a third embodiment of the present disclosure.

FIG. 9 is a block diagram illustrating a configuration of a transmission apparatus 500 according to the present embodiment. In FIG. 9, similar components to those in the first embodiment (FIG. 1) or to those in the second embodiment (FIG. 4) are denoted by similar reference symbols, and a duplicated explanation thereof is omitted.

In the transmission apparatus 500 shown in FIG. 9, two mapping units 301, two frequency-time conversion units 104, two time-division multiplexing units 302, and two CP addition units 105 are provided for respective antennas 106-1 and 106-2.

The mapping units 301-1 and 301-2 respectively place the frequency components of signals (analog signals), which are signals generated by the space-time coding unit 103 and which are to be transmitted by the respective antennas 106-1 and 106-2, at equally spaced discrete locations over a band (transmission band) wider than a frequency band over which an original signal is mapped.

The time-division multiplexing units 302-1 and 302-2 respectively multiplex signals (analog signals) transmitted from the respective antennas 106-1 and 106-2 and preamble signals which are digital signals having non-repetitive time waveforms.

Figure 10:
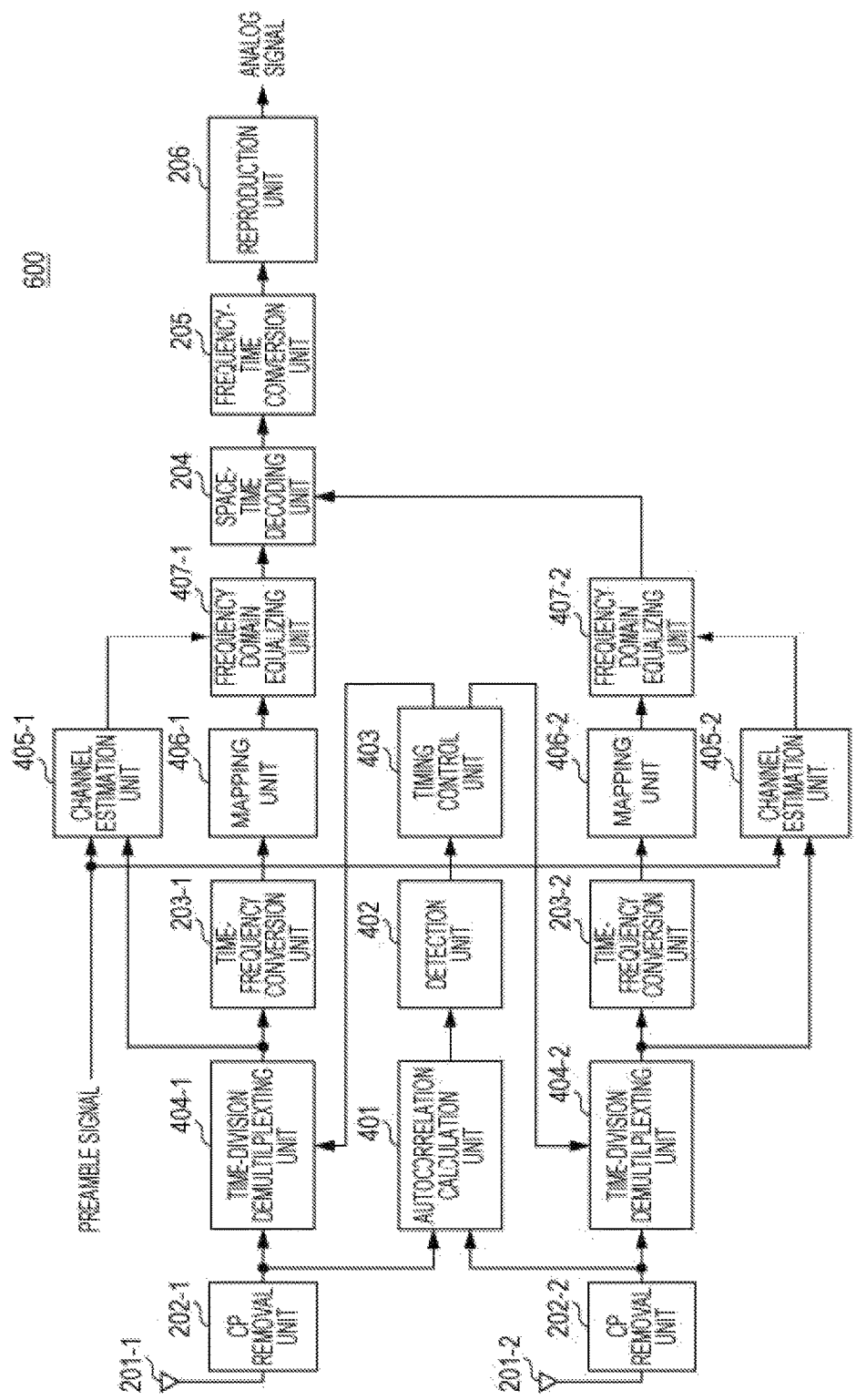
FIG. 10 illustrates a configuration of a reception apparatus according to the third embodiment of the present disclosure.

FIG. 10 is a block diagram illustrating a configuration of a reception apparatus 600 according to the present embodiment. In FIG. 10, similar components to those in the first embodiment (FIG. 2) or to those in the second embodiment (FIG. 5) are denoted by similar reference symbols, and a duplicated explanation thereof is omitted.

In the reception apparatus 600 shown in FIG. 10, two CP removal units 202, two time-division demultiplexing units 404, two time-frequency conversion units 203, two mapping units 406, and two frequency-domain equalization units 407 are provided for respective antennas 201-1 and 201-2.

The autocorrelation value calculation unit 401, the detection unit 402, and the timing control unit 403 calculate the autocorrelation value using the preamble signal received from the CP removal unit 202-1 or the CP removal unit 202-2 and detect a peak using the calculated autocorrelation value thereby achieving timing synchronization.

The time-division demultiplexing units 404-1 and 404-2 demultiplex the received signals received via the respective antennas 201-1 and 201-2 into preamble signals and analog signals based on control information received from the timing control unit 403. The channel estimation units 405-1 and 405-2 perform, using the preamble signals, estimation of the channel response on the received signals received via the respective antennas 201-1 and 201-2. The mapping units 406-1 and 406-2 place the received signals (analog signals whose frequency components are mapped at equally spaced discrete locations) received via the respective antennas 201-1 and 201-2 at continuous locations in the frequency domain. The frequency-domain equalization units 407-1 and 407-2 perform the frequency-domain equalization process on the signals received from the respective mapping units 406-1 and 406-2 using the channel estimation values received from the respective channel estimation units 405-1 and 405-2.

The space-time decoding unit 204 performs a decoding process on the space-time block code (STBC) for each frequency component using the frequency components subjected to the FDE and received from the respective frequency-domain equalization units 407-1 and 407-2.

According to the present embodiment, as described above, the transmission apparatus 500 applies the STTD algorithm to the analog signal having frequency components mapped at equally spaced discrete locations so as to place the frequency components of the signals of the respective antennas 106 at equally spaced discrete locations. Furthermore, the transmission apparatus 500 multiplexes the preamble signals, which are digital signals having non-repetitive time waveforms, with the analog signal and adds CP thereto, and the transmission apparatus 500 transmits the resultant signals. On the other hand, the reception apparatus 600 performs the FDE process, based on the channel estimation values calculated using the preamble signals, on the received signals received via the respective antennas 201, and the reception apparatus 600 performs the STBC decoding using the resultant signals subjected to the FDE process.

In the present embodiment, by performing the process as described above, it is possible to achieve both the spatial diversity effect and the frequency diversity effect at the same time for a narrowband analog signal, and thus it is possible to further improve the transmission characteristic of the analog signal. Furthermore, according to the present embodiment, it is possible at the receiving end to achieve high-accuracy timing synchronization as in the second embodiment, and besides it is also possible to accurately perform the STTD decoding process based on the channel estimation value having an amplitude and a phase component in addition to the FDE process at the receiving end.

The present disclosure has been described above with reference to embodiments.

Other Embodiments

In the embodiments described above, it is assumed by way of example that the present disclosure is implemented using hardware. However, the present disclosure may be implemented using software in cooperation with hardware.

Each functional block according to the embodiments described above may be typically realized by an integrated circuit such as a LSI. Each of the functional blocks may be formed individually on one chip, or part or all of the functional blocks may formed on one chip. The form of the integrated circuit is not limited to the LSI, but various other types of integrated circuits such as an IC, a system LSI, a super LSI, an ultra LSI, and the like may be employed.

Furthermore, the integrated circuit is not limited to the LSI, but the integrated circuit may be realized in the form of a dedicated circuit, a general-purpose processor, or the like. The integrated circuit may also be realized using a field programmable gate array (FPGA) LSI that is allowed to be programmed after the production of the LSI is completed, or a reconfigurable processor that is allowed to be reconfigured in terms of the connection or the setting of circuit cells in the inside of the LSI after the production of the LSI is completed.

When a new integration circuit technique other than LSI techniques are realized in the future by an advance in semiconductor technology or related technology, the functional blocks may be realized using such a new technique. A possible example of a new technique is biotechnology.

As described above, the present disclosure provides a transmission apparatus comprising a mapper that maps frequency components of an analog signal at equally spaced discrete locations within a transmission frequency band, a multiplexer that time-division multiplexes the analog signal and a preamble signal to generate a transmission signal, the preamble signal being a digital signal whose frequency components are continuously mapped over the transmission frequency band, and a transmitter that transmits the transmission signal, an autocorrelation value of the transmission signal being to be used for timing synchronization at a reception apparatus that receives the transmission signal.

In the transmission apparatus according to the present disclosure, the analog signal is a signal having a time waveform appearing repeatedly in a fixed time period, and the preamble signal is a signal with no repetition of a certain time waveform in the fixed time period.

In the transmission apparatus according to the present disclosure, the preamble signal is a Chu sequence or a Zadff-Chu sequence.

In the transmission apparatus according to the present disclosure, the preamble signal is shared between the transmission apparatus and the reception apparatus.

The transmission apparatus according to the present disclosure wherein the transmitter comprises a plurality of antennas, and the transmission apparatus further comprises a coder that performs a space-time block coding on signal blocks, each of the signal blocks comprising a predetermined number of analog signals, and generates a plurality of signals to be respectively transmitted from the plurality of antennas, wherein the mapper maps frequency components of each of the plurality of signals at equally spaced discrete locations within the transmission frequency band, and the multiplexing unit time-division multiplexes each of the plurality of signals to be respectively transmitted from the plurality of antennas and the preamble signal.

The present disclosure provides a reception apparatus including a receiver that receives a signal that is generated at a communication partner apparatus by time-division multiplexing an analog signal and a preamble signal, the analog signal having its frequency components mapped at equally spaced discrete locations within a transmission frequency band, the preamble signal being a digital signal having its frequency components continuously mapped over the transmission frequency band, a controller that achieves timing synchronization using an autocorrelation value of the received signal, a demultiplexer that demultiplexes the received signal into the analog signal and the preamble signal based on a result of the timing synchronization, an estimator that estimates a channel response by using the preamble signal, a mapper that maps the frequency components of the analog signal at continuous locations over the transmission band, and a frequency-domain equalizer that performs frequency-domain equalization by using the estimated channel response on the analog signal whose frequency components are continuously mapped.

The present disclosure provides a transmission method including mapping frequency components of an analog signal at equally spaced discrete locations within a transmission frequency band, time-division multiplexing the analog signal and a preamble signal to generate a transmission signal, the preamble signal being a digital signal whose frequency components are continuously mapped over the transmission frequency band, and transmitting the transmission signal, an autocorrelation value of the transmission signal being to be used for timing synchronization at a reception apparatus that receives the transmission signal.

The present disclosure provides a reception method including receiving a signal that is generated at a communication partner apparatus by time-division multiplexing an analog signal and a preamble signal, the analog signal having its frequency components mapped at equally spaced discrete locations within a transmission frequency band, the preamble signal being a digital signal having its frequency components continuously mapped over the transmission frequency band, achieving timing synchronization using an autocorrelation value of the received signal, demultiplexing the received signal into the analog signal and the preamble signal based on a result of the timing synchronization, estimating a channel response by using the preamble signal, mapping the frequency components of the analog signal at continuous locations in a part of the transmission frequency band, and performing frequency-domain equalization by using the channel response on the analog signal whose frequency components are continuously mapped.

The present disclosure is useful in mobile communication systems.

What is claimed is:

1. A transmission apparatus comprising:

mapping circuitry, which, in operation, maps frequency components of an analog signal at equally spaced discrete locations within a transmission frequency band;

multiplexing circuitry, which, in operation, time-division multiplexes the analog signal and a preamble signal to generate a transmission signal, the preamble signal being a digital signal whose frequency components are continuously mapped over the transmission frequency band; and a transmitter, which, in operation, transmits the transmission signal, the transmission signal having an autocorrelation value to be used for timing synchronization at a reception apparatus that receives the transmission signal.

2. The transmission apparatus according to claim 1, wherein the analog signal is a signal having a time waveform appearing repeatedly in a fixed time period, and the preamble signal is a signal with no repetition of a certain time waveform in the fixed time period.

3. The transmission apparatus according to claim 1, wherein the preamble signal is a Chu sequence or a Zadff-Chu sequence.

4. The transmission apparatus according to claim 1, where the preamble signal is shared between the transmission apparatus and the reception apparatus.

5. The transmission apparatus according to claim 1, wherein the transmitter comprises a plurality of antennas, and the transmission apparatus further comprises coding circuitry, which, in operation, performs a space-time block coding on signal blocks, each of the signal blocks comprising a determined number of analog signals, and generates a plurality of signals to be respectively transmitted from the plurality of antennas, wherein the mapping circuitry, in operation, maps frequency components of each of the plurality of signals at the equally spaced discrete locations within the transmission frequency band, and the multiplexing circuitry, in operation, time-division multiplexes each of the plurality of signals to be respectively transmitted from the plurality of antennas and the preamble signal.

6. A reception apparatus comprising:

a receiver, which, in operation, receives a signal that is generated at a communication partner apparatus by time-division multiplexing an analog signal and a preamble signal, the analog signal having its frequency components mapped at equally spaced discrete locations within a transmission frequency band, the preamble signal being a digital signal having its frequency components continuously mapped over the transmission frequency band;

control circuitry, which, in operation, achieves timing synchronization using an autocorrelation value of the received signal;

demultiplexing circuitry, which, in operation, demultiplexes the received signal into the analog signal and the preamble signal based on a result of the timing synchronization;

estimating circuitry, which, in operation, estimates a channel response by using the preamble signal;

mapping circuitry, which, in operation, maps the frequency components of the analog signal at continuous locations in a part of the transmission frequency band; and equalizing circuitry, which, in operation, performs frequency-domain equalization by using the estimated channel response on the analog signal whose frequency components are continuously mapped.

7. A transmission method comprising:

mapping frequency components of an analog signal at equally spaced discrete locations within a transmission frequency band;

time-division multiplexing the analog signal and a preamble signal to generate a transmission signal, the preamble signal being a digital signal whose frequency components are continuously mapped over the transmission frequency band; and transmitting the transmission signal, the transmission signal having an autocorrelation value to be used for timing synchronization at a reception apparatus that receives the transmission signal.

8. A reception method comprising:

receiving a signal that is generated at a communication partner apparatus by time-division multiplexing an analog signal and a preamble signal, the analog signal having its frequency components mapped at equally spaced discrete locations within a transmission frequency band, the preamble signal being a digital signal having its frequency components continuously mapped over the transmission frequency band;

achieving timing synchronization using an autocorrelation value of the received signal;

demultiplexing the received signal into the analog signal and the preamble signal based on a result of the timing synchronization;

estimating a channel response by using the preamble signal;

mapping the frequency components of the analog signal at continuous locations over the transmission band; and performing frequency-domain equalization by using the estimated channel response on the analog signal whose frequency components are continuously mapped.

* * * * *